United States Patent [19]

Minami et al.

[11] Patent Number: 4,813,806
[45] Date of Patent: Mar. 21, 1989

[54] WELDING BEVELING OF T-JOINT

[75] Inventors: Nagio Minami; Tamotu Oka, both of Hiroshima, Japan

[73] Assignee: Mitsubishi Jukogyo Kabushiki Kaisha, Tokyo, Japan

[21] Appl. No.: 835,933

[22] Filed: Mar. 4, 1986

[30] Foreign Application Priority Data

Sep. 3, 1985 [JP] Japan ................. 60-134768

[51] Int. Cl.$^4$ ............................ B23K 1/12; F01D 5/30
[52] U.S. Cl. .................................. 403/268; 403/272; 403/13; 416/213 R; 228/214; 219/137 R
[58] Field of Search .................. 403/11, 13, 265, 270, 403/271, 272; 219/136, 137 R; 228/214, 215, 203; 416/213 R

[56] References Cited

U.S. PATENT DOCUMENTS

| | | | |
|---|---|---|---|
| 1,770,852 | 7/1930 | Hill | 403/272 X |
| 1,805,181 | 5/1931 | Miller | 228/214 X |
| 2,019,460 | 10/1935 | Mahan | 403/270 |
| 2,329,270 | 9/1943 | Jones | 403/270 |
| 3,436,521 | 4/1969 | Corrigan et al. | 228/215 X |
| 3,458,224 | 7/1960 | Freese | 403/272 X |
| 3,465,420 | 9/1969 | Webb et al. | 228/215 X |
| 3,512,811 | 5/1970 | Bardgette et al. | 403/272 X |
| 3,533,153 | 10/1970 | Melill et al. | 228/214 X |
| 3,873,139 | 3/1975 | McCabe | 403/272 X |
| 4,182,950 | 1/1980 | Boros | 403/272 R X |
| 4,201,516 | 5/1980 | Kolk et al. | 416/213 R |
| 4,588,652 | 5/1986 | Reynard | 228/214 X |

Primary Examiner—Andrew V. Kundrat
Assistant Examiner—Peter M. Cuomo
Attorney, Agent, or Firm—Holman & Stern

[57] ABSTRACT

A welding beveling of a T-joint of a member welded to a rib on a lower plate, the rib varying in thickness along its length, comprises a beveling on an upper plate partially overlapping the rib at the thicker portion of the rib and having a clearance between the upper plate and the rib at the thinner portion, and a part of the beveling at the thicker rib portion being provided with a detecting hole for detecting the overlap.

13 Claims, 2 Drawing Sheets

WELDING BEVELING OF T-JOINT

BACKGROUND OF THE INVENTION

1. Field of the Invention

This invention relates to a welding beveling (groove) of a T-joint for a member to be welded to a rib which varies in thickness, along its length for example as in a joint of an impeller assembly in a compressor.

2. Description of the Prior Art

The welding beveling of a T-joint as shown in FIGS. 1 and 7 is known in order to perform a welded assembly of an impeller in a compressor. However, when the thickness of a rib 2 of a lower plate 1 changes in the direction of the length of the rib as shown (right angular direction against the paper) in FIG. 1, particularly where the thickness of the rib varies from a super thin thickness of about 2 mm to a thickness of 8 to 10 mm, the formation of the weld penetration in the rib 2, the penetration at beveling 4 of an upper plate 3, and a fixed uniformity of the penetration bead are difficult to obtain by merely changing the welding conditions with respect to the welding beveling where the overlapping of the upper plate 3 with the rib 2 is adapted to be a fixed dimension corresponding to the change of the thickness of the rib 2.

As described above, when the thickness of the rib 2 changes from the super thin thickness of about 2 mm to 8–10 mm the change of the welding condition at the welding beveling having a fixed overlap cannot produce a stable and uniform penetration bead at the superthin thickness portion even if a small current is used as a welding condition because the heat is accumulated at the side of the rib 2 and causes; deep penetration due to small heat transfer at the side of the rib 2.

Further, in a T-joint, it is necessary to set the upper plate 3 on the upper surface of the rib 2 in order to determine the clearance (the height of the rib). In the prior art, when the upper plate 3 at beveling 4 is set on the whole surface of the rib 2, the positions of the right and left sides, and of the front and the rear of the beveling 4 and the rib 2 cannot be observed. Further, when the set position is out of place, a uniform bead cannot be obtained due to forming a large penetration bead, or discontinuance thereof.

BRIEF SUMMARY OF THE INVENTION

An object of the present invention is to provide a welding beveling of a T-joint which can obtain uniform penetration of the bead by removing the defects described above.

For this purpose, in the welding beveling of a T-joint of the member having a rib which changes in thickness the present invention provides that the thick portion of the rib occurs at the beveling where a part of the upper plate is adapted to overlap the rib and further, a part at the beveling of thick portion of the rib is provided with a detecting hole or notch for detecting the overlapping state together with a beveling having a clearance between the upper plate and the rib at the thin portion of the rib.

Therefore, the present invention obtains the following effects:

(1) The thick portion of the rib can keep the distance between the lower plate, which supports the upper plate, and the upper plate at a fixed dimension by forming the dimension of the beveling so that the beveling overlaps the rib (e.g. by 0.5 mm);

(2) A uniform penetration bead can be formed at the thin portion of the rib with small current which does not melt through by adapting the beveling dimension to form a clearance (e.g. the clearance of 0.5 mm) between the rib and the beveling;

(3) The setting of the rib with respect to the beveling can be observed through clearances provided partially at the rib and beveling by providing a detecting hole at the edge portion of the beveling at a part of the thick portion of the rib. This detecting hole is effective when the rib and the beveling are worked by bending, and for tack welding.

The objects, features and advantage of the present invention will become more clear by the following detailed description with reference to the accompanying drawings wherein:

DETAILED DESCRIPTION

Figure 1:
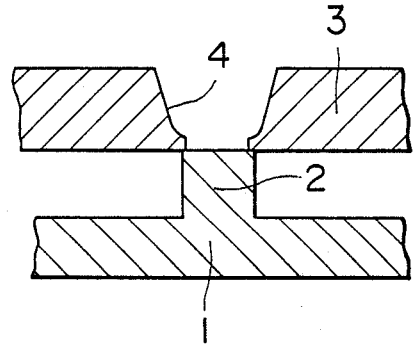
FIG. 1 is a cross sectional view of a prior beveling.
Figure 2:
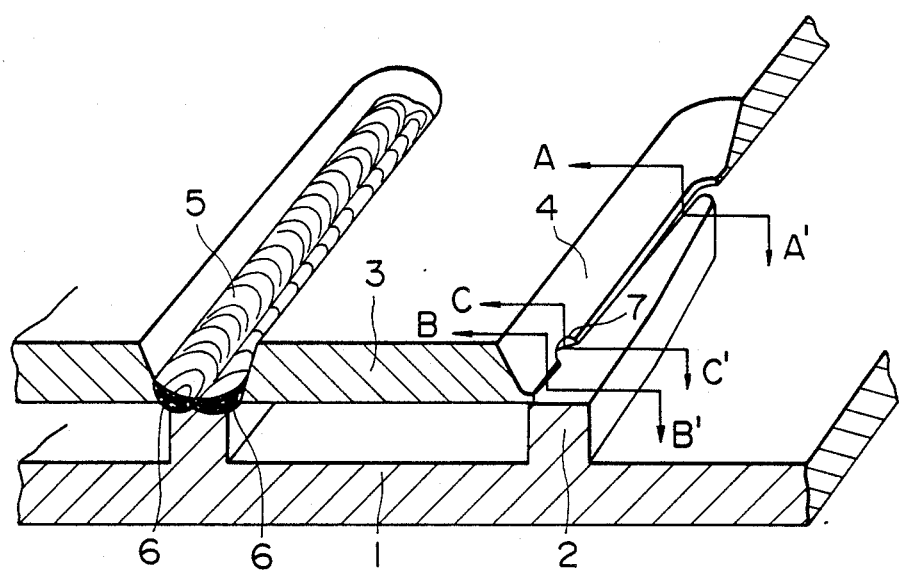
FIG. 2 is a perspective cross-sectional view of the beveling section of an embodiment according to the present invention.
Figure 3:
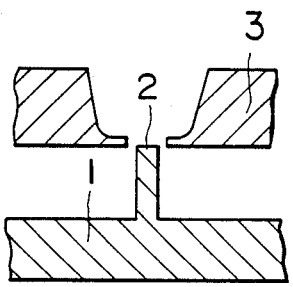
FIG. 3 is a cross-sectional view taken along the line A—A' of FIG. 2.
Figure 4:
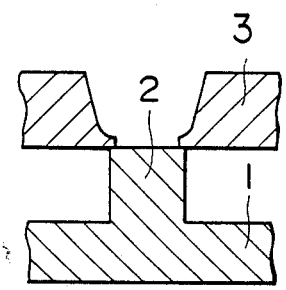
FIG. 4 is a cross-sectional view taken along the line B—B' of FIG. 2.
Figure 5:
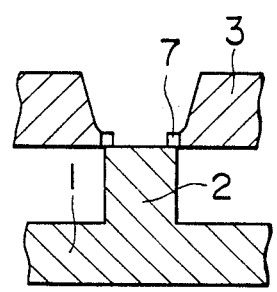
FIG. 5 is a cross-sectional view taken along the line C—C' of FIG. 2.

In FIGS. 2 to 5, reference numeral 1 designates a lower plate and numeral 2 a rib of the lower plate 1. The rib 2 varies in thickness in the direction of the length thereof. Reference numeral 3 designates an upper plate arranged on the rib 2. In the beveling 4 provided on upper plate 3, as shown in FIGS. 3 to 5, the portion (B—B') at the thick portion of the rib is where a part of the upper plate is overlapped (see FIG. 4), the portion (A—A') at the thin portion of the rib is where a clearance exists between the upper plate and the rib (see FIG. 3), and the portion (C—C') at a part of the thick portion of the rib is where a detecting hole or notch 7 is provided for detecting the overlapping state (see FIG. 5). When a T-joint is constituted by welding such beveling, a welding metal 5 and a penetration bead 6 are formed as shown in the left half side in FIG. 2.

The result of welding according to such a beveling will be described regarding the embodiment.

Figure 6:
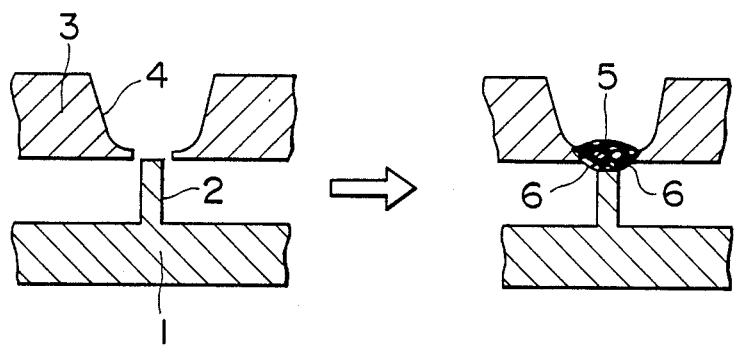
FIGS. 6 and 7 are cross-sectional views for explaining the welding states of the bevelings according to the present invention and the prior art, respectively.

A T-joint a narrow clearance member having 2 mm in thickness at both ends of rib 2 in right and left sides, 8 mm in thickness at the central portion of rib 2, 8 mm in rib height and 50 mm in rib pitch, is subjected to T1G welding using Cr-Mo steel as the lower plate 1. The state after being subjected to T1G welding in accordance with the invention as shown in FIG. 6 is compared with conventional beveling as shown in FIG. 7.

Figure 7:
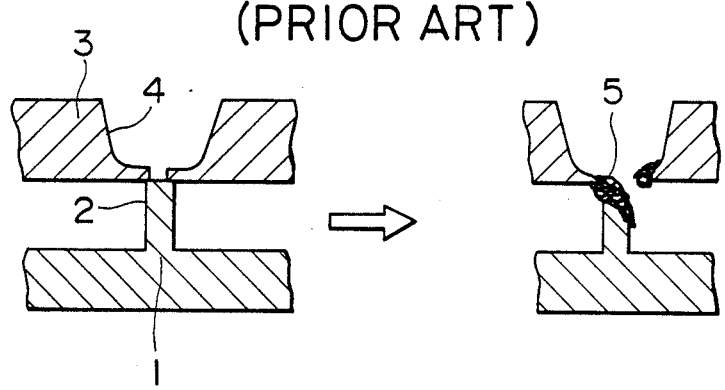

The result is that in the conventional beveling 4, wherein the width of the overlapping is adapted to be 0.5 mm throughout the entire length of the rib, the penetration bead 6 of the welding metal 5 has melted through or is discontinuous as shown in FIG. 7 to the right of the arrow, though the thin portion at the end of rib 2 is subjected to T1G welding at 100A of welding current. However, in the present invention, at the portion of beveling 4 having 0.5 mm of clearance on the right and left sides of the thin portion at the top end of the rib thereof, a uniform penetration bead 6 can be obtained by the same welding described above with 90A of welding current as shown in FIG. 6 at the right of the arrow. Further, at the thick portions of the rib in both the prior art and the present inventions, a good penetration bead can be obtained at 150A of welding current with the beveling having 0.5 mm overlap (see the section of FIG. 4).

In the beveling according to the present invention, one detecting hole or notch 7, 9 mm in diameter, is provided in the beveling in the area of the thick portion substantially at the center of the rib 2 and clearances 0.5 mm in diameter are provided on the right and left sides at the sides of the rib 2 and each side of the beveling having the detecting hole 7, thereby enabling the rib to be accurately set with respect to the beveling on the upper plate because the position of the rib on the right and left sides can be detected correctly from the upper surface of the beveling.

Therefore, the following effects can be obtained according to the present invention.

(1) The upper plate can be supported at a fixed dimensional distance because in the thick portion of the rib, the rib is overlapped by the beveling;

(2) At the thin portion of the rib in the present invention there exists a clearance between the rib and the beveling, and the welding metal does not melt through even if the welding is performed with very small current, thereby enabling a uniform penetration bead to be obtained;

(3) The beveling portion of the upper plate can be set correctly on the rib because the detecting hole is provided in a portion of the beveling at the thick portion of the rib.

What is claimed is:

1. In a welded joint between a first member having a welding beveling and a rib on a second member, wherein the rib has a varying thickness along its length with thick and thin portions and a weld bead provides the welded joint, the improvement wherein:

said welding beveling comprises a beveled edge on said first member having a portion partially overlapping said rib at said thick portion thereof;

a clearance is provided between another portion of said beveled edge and said rib along at least a part of said thin portion of said rib; and a detecting cutout is provided in said portion of said beveled edge which partially overlaps said rib for facilitating detection of the position of said beveled edge relative to said rib, so that the welded joint has a uniform penetration by the weld bead.

2. The improvement as claimed in claim 1 wherein:
said overlapping comprises approximately 0.5 mm; and
said clearance comprises approximately 0.5 mm.

3. The improvement as claimed in claim 1 wherein:
said rib has a tapering configuration forming said thick and thin portions.

4. The improvement as claimed in claim 1 wherein:
said first and second members comprise plate-shaped members.

5. The improvement as claimed in claim 1 wherein:
said welded joint comprises a T-joint between said rib and said first member.

6. The improvement as claimed in claim 5 wherein:
said first and second members comprise plate-shaped members.

7. The improvement as claimed in claim 6 wherein:
said rib has a tapering configuration forming said thick and thin portions.

8. The improvement as claimed in claim 1 wherein:
said first and second members are spaced apart by said rib;
said rib has a substantially flat welding surface to which said beveled edge is welded; and
said rib varies in thickness between about 8 mm at said thick portion and about 2 mm at said thin portion.

9. The improvement as claimed in claim 8 wherein:
said overlapping comprises approximately 0.5 mm; and
said clearance comprises approximately 0.5 mm.

10. The improvement as claimed in claim 9 wherein:
said rib has a tapering configuration forming said thick and thin portions.

11. The improvement as claimed in claim 10 wherein:
said welded joint comprises a T-joint between said rib and said first member.

12. The improvement as claimed in claim 11 wherein:
said first and second members comprise plate-shaped members.

13. The improvement as claimed in claim 12 wherein:
said detecting cut-out comprises a substantially semicircular notch in said beveled edge having a diameter of approximately 9 mm.

* * * * *